United States Patent
Wei (10) Patent No.: US 12,236,118 B2
(45) Date of Patent: *Feb. 25, 2025

(54) SMART SWAPPING AND EFFECTIVE ENCODING OF A DOUBLE WORD IN A MEMORY SUB-SYSTEM

(71) Applicant: Micron Technology, Inc., Boise, ID (US)

(72) Inventor: Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,683

(22) Filed: Dec. 15, 2023

(65) Prior Publication Data

US 2024/0134554 A1   Apr. 25, 2024

Related U.S. Application Data

(63) Continuation of application No. 17/395,700, filed on Aug. 6, 2021, now Pat. No. 11,868,633.

(51) Int. Cl.
*G06F 3/06* (2006.01)

(52) U.S. Cl.
CPC ............ *G06F 3/064* (2013.01); *G06F 3/0604* (2013.01); *G06F 3/0619* (2013.01); *G06F 3/0659* (2013.01); *G06F 3/0679* (2013.01)

(58) Field of Classification Search
CPC ............. G06F 12/0246; G06F 12/1009; G06F 12/1027; G06F 12/10; G06F 12/1036; G06F 2212/7201; G06F 2212/2022; G06F 2212/65; G06F 2212/657; G06F 3/0679; G06F 3/064; G06F 3/0688; G06F 3/0659; G06F 3/0604; G06F 3/0661; G06F 3/0607; G06F 2009/45583

See application file for complete search history.

(56) References Cited

U.S. PATENT DOCUMENTS

2016/0210241 A1* 7/2016 Jacobs ................ G06F 12/0246

OTHER PUBLICATIONS

Cox, Guilherme et al., "Efficient Address Translation for Architectures with Multiple Page Sizes", Apr. 2017, ACM SIGPLAN Notices, vol. 52 Issue 4, pp. 435-448 https://doi.org/10.1145/3093336.3037704 (Year: 2017).*

(Continued)

*Primary Examiner* — Curtis James Kortman
(74) *Attorney, Agent, or Firm* — Lowenstein Sandler LLP (57) ABSTRACT

A processing device identifies a first set of bits associated with a translation unit of a memory device, wherein the first set of bits correspond to a page field; identifies a second set of bits associated with the translation unit, wherein the second set of bits corresponds to a block field; updates a first portion of an address mapping table corresponding to the second set of bits with a value representing a difference between a value stored in the page field and a threshold value; updates a second portion of the address mapping table corresponding to the first set of bits with a value representing a block number; determines, based on the updated first portion and the updated second portion, that a swapping condition is satisfied; and performs a data access operation on a set of memory cells residing at a location corresponding to the translation unit.

20 Claims, 6 Drawing Sheets

(56) References Cited

OTHER PUBLICATIONS

Cox G., et al., "Efficient Address Translation for Architectures With Multiple Pag Sizes," ACM SIGPLAN Notices, 2017, vol. 52, No. 4, pp. 435-448. Retrieved from the Internet: URL:https://doi.org/10.1145/3093336.3037704.

* cited by examiner

Identify a first set of bits associated with a translation unit of a memory device, wherein the first set of bits corresponds to a page field 302

Identify a second set of bits associated with the translation unit of the memory device, wherein the second set of bits corresponds to a block field 304

Determine that a value representing a page number stored in the page field satisfies a threshold criterion 306

Determine a difference between the value representing the page number and a threshold value associated with the threshold criterion 308

Store a value representing the difference as a plurality of bits of the second set of bits 310

Store a value representing a block number stored in the block field as a plurality of bits of the first set of bits 312

Identify a first set of bits associated with a translation unit of a memory device, wherein the first set of bits corresponds to a page field 502

Identify a second set of bits associated with the translation unit of the memory device, wherein the second set of bits corresponds to a block field 504

Determine that a fixed value is stored as a first bit and a second bit of the second set of bits 506

Compute a computed value based on a value stored in the block field and a threshold value associated with a threshold criterion 508

Determine a page number based on the computed value 510

Determine a block number based on a value stored in the page field 512

SMART SWAPPING AND EFFECTIVE ENCODING OF A DOUBLE WORD IN A MEMORY SUB-SYSTEM

RELATED APPLICATIONS

The present application is a continuation of U.S. patent application Ser. No. 17/395,700, filed on Aug. 6, 2021, which is incorporated herein by reference in its entirety for all purposes.

TECHNICAL FIELD

Embodiments of the disclosure relate generally to memory sub-systems, and more specifically, relate to smart swapping and effective encoding of a double word in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to smart swapping and effective encoding of a double word in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A die is also hereinafter referred to as a logical unit identified by a logic unit number (LUN). In some conventional memory sub-systems, a LUN can have a size of 64 GB. Data stored within each LUN can be represented as one or more chunks of data. In some examples, each chunk of data can be one or more logical pages. A logical page is an abstraction of a physical page. The size of data in a chunk of data can be 512 bytes, 4096 bytes (4KB), etc., depending on the memory device configuration. Each chunk of data can also be referred to as a translation unit (TU). For some types of memory devices (e.g., NAND), a TU is a base granularity of data managed by the memory device. A TU can include a predefined number of logical units (e.g., logical pages, logical blocks, etc.). In some examples, a TU is predefined to include one logical block, so the size of the TU equals the size of the logical block. In some examples, a TU is predefined to include multiple logical blocks. In that case, the size of the TU is a multiple of the size of the logical blocks. In one example, a TU can be predefined to include one 512 byte logical block, so the size of the TU is 512 bytes. In another example, a TU can be predefined to include one 4KB logical block (which can include multiple logical pages), so the size of the TU is 4KB. In yet another example, a TU can be predefined to include eight 512 byte logical blocks, totaling a size of (8*512) bytes, or 4096 bytes (4KB).

When a host system of a memory sub-system requests to access data (e.g., read data, write data), the host system can send a data access request to the memory device directed to a TU location within a LUN. For example, the host system can provide a logical address (e.g., a logical block address (LBA), an LBA with an offset, etc.) identifying the location where the data is to be stored at or read from. Since the data from the host system is eventually to be stored at a physical address within the memory device, the memory sub-system maintains a logical to physical (L2P) translation map, or table (e.g., address mapping table), to identify the physical location where the data corresponding to each logical address resides. The L2P map can include a number of L2P entries. Each entry in an L2P map can identify a physical location corresponding to a particular TU. The L2P map tracks every TU segment that has been written to the memory sub-system by maintaining its physical address. For example, an L2P entry can include an index of the TU (e.g., TU 0, TU 1, etc.), corresponding physical addresses, some metadata, such as a flag that indicates whether the data at an address is valid or invalid, etc. The L2P entry can also be referred to as a double word. Each double word can include 32 bits.

In a conventional memory sub-system, the 32 bits in each double word can represent different fields, such as a LUN number, a block number, a page number, a plane number, and a TU offset. Traditionally, memory devices require the same amount of bits to represent certain fields, including TU offset and plane number, but different amounts of bits to represent other fields such as page count and block count. The number of bits required for fields such as page count and block count can depend on the drive density and parameters of the memory device. For example, in a memory device where the page count is 5184 KB and the block count is 236 KB, the page number field would require ($2^{13}$) or 13 bits to be represented in a double word, and the block number field would require ($2^8$) or 8 bits to be represented in the double word, which is a total of 21 bits. In another memory device, the page count can be 2112 KB and the block count can be 556 KB. In this case, the page number field would require ($2^{12}$) bits to be represented in a double word, and the block number field would require ($2^{10}$) bits to the represented in the double word, which is a total of 22 bits. Thus, depending on the parameters of the memory device, an extra bit or more could be required to represent fields in a double word.

Since each double word has a size of 32 bits, each bit is expensive to sacrifice. For example, some conventional memory sub-systems can use a bit (e.g., bit 31) of a double word to be a parity bit. A parity bit is used to detect errors in the data and is thus important for data integrity purposes. In order to maintain a double word for a memory device in which the page number field and block number field require 22 bits like in the example described above, conventional memory sub-systems can take the bit that would be required for the parity bit. However, this would disable the protection that a parity bit would provide, which can lead to undetectable errors in the data and poor memory sub-system performance. In other examples, conventional memory sub-systems can take an extra bit from another field, such as the LUN field. However, removing even one bit used for representing the LUN field can lead to a reduction in drive density. Drive density is the amount of data that a memory device can hold. For example, if the LUN field is reduced from 6 bits to 5 bits and the size of a LUN is 64 GB, the drive density will be reduced by a half (i.e., 64 GB*$2^6$=4 TB vs. 64 GB*$2^5$=2 TB). This can result in reduced performance of the memory device. To avoid the problems discussed above, some conventional memory sub-systems can use a larger double word (with a size of more than 32 bits). However, an increased double word size can require extra DRAM space for the extra bits, which is costly.

Aspects of the present disclosure address the above and other deficiencies by having a memory sub-system that utilizes smart swapping and effective encoding of the page number field and the block number field in a double word. In order to support memory sub-systems with memory devices that require a higher number of bits in order to represent either a page count and/or block count, an extra bit is not taken from other fields, such as the parity bit field or LUN field. Instead, the memory sub-system identifies a set of page field bits associated with a TU and identifies a set of block field bits associated with the TU. For example, the set of page field bits may be 12 bits, and the set of block field bits may be 10 bits. The memory sub-system allocates 11 bits instead of 12 bits to the set of page field bits. The memory sub-system determines that the value representing the page number stored in the page field bits satisfies some threshold value (e.g., 2047 KB). If the value representing the page number satisfies that threshold value, then the memory sub-system calculates the difference between the value representing the page number and the threshold value. The memory sub-system stores a value representing the calculated difference as a set of block field bits. The memory sub-system also stores a value representing the block number stored in the block field bits in the set of page field bits. Thus, the memory sub-system swaps the page field and block fields, which saves one extra bit. The memory sub-system can further indicate that the page field and block fields have been swapped using a set of conditions, which can include storing a fixed value as the first two bits of the block field bits. If it is determined that the fixed value is stored as the first two bits of the block field bits, the memory sub-system will know that the set of conditions has been satisfied and thus the page field and block fields have been swapped and can be decoded if necessary.

Advantages of the present disclosure include, but are not limited to saving at least one bit in a double word. This one bit can be used for representing a parity bit, which can be used to validate data in case of any errors as described above. This saved bit can also be used for representing the LUN field. Extra bits in the LUN field can result in support for larger drive density as described above. Therefore, saving at least one bit can result in an increased performance and increased efficiency of the memory device with minimal changes.

Figure 1:
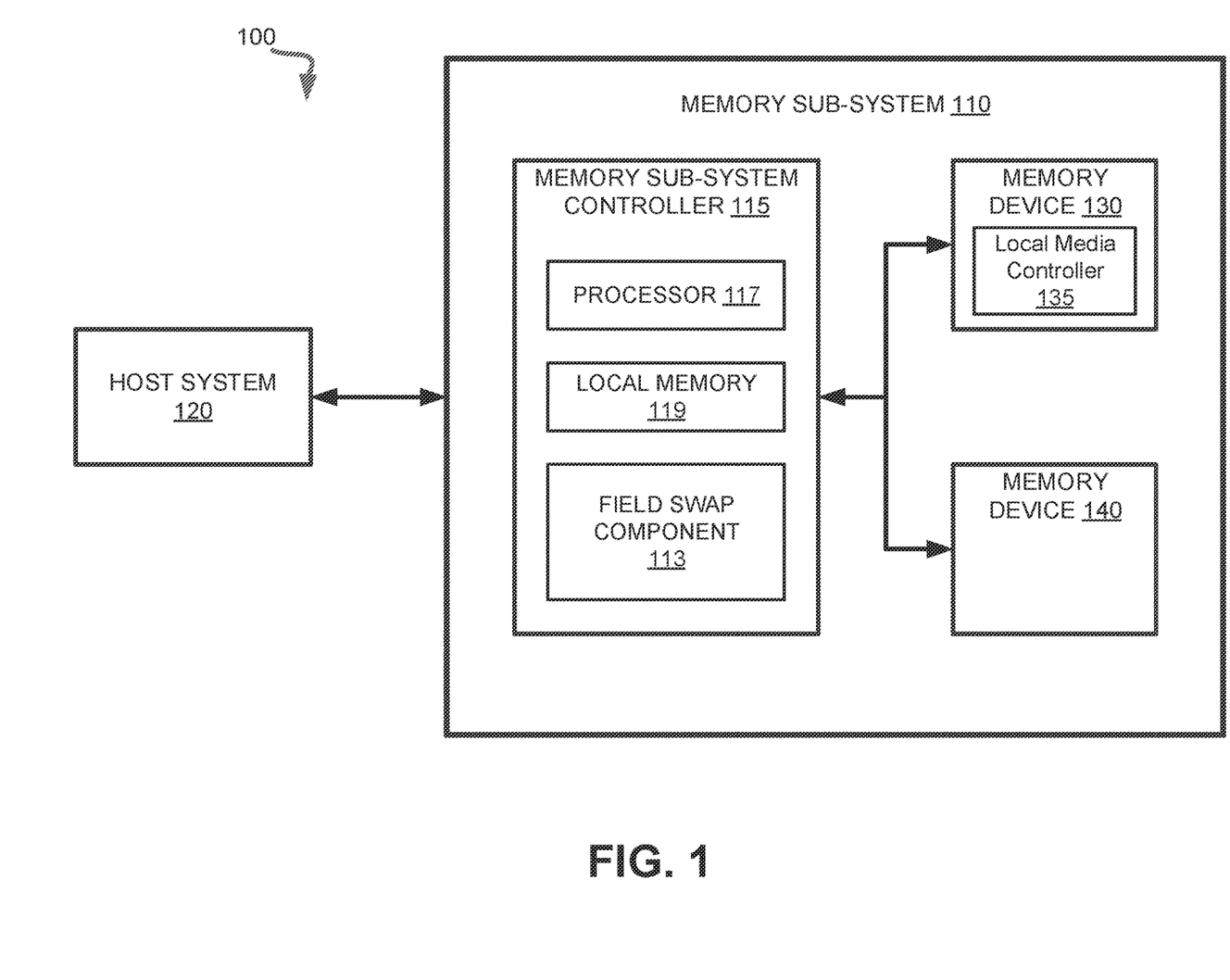
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a field swap component 113 that can perform smart swapping and efficient encoding of a double word of a memory device. In some embodiments, the memory sub-system controller 115 includes at least a portion of the field swap component 113. In some embodiments, the field swap component 113 is part of the host system 110, an application, or an operating system. In other embodiments, local media controller 135 includes at least a portion of field swap component 113 and is configured to perform the functionality described herein.

The field swap component 113 can identify a set of page field bits associated with a TU of a memory device. The field swap component 113 can further identify a set of block field bits associated with the TU. The field swap component 113 can determine the size of the set of page field bits and the size of the set of block field bits based on parameters of the memory device, such as the page count and block count. The field swap component 113 can allocate a certain number of bits to the set of page field bits. For example, the field swap can determine that the size of the set of page field bits is 12 bits, and size of the set of block field bits is 10 bits. The field swap component 113 can allocate one less bit to the set of page field bits, i.e., 11 bits instead of 12 bits. The field swap component 113 can determine that the value representing the page number stored in the page field bits satisfies some threshold value (e.g., 2047 KB). If the value representing the page number satisfies that threshold value, then the field swap component 113 can calculate the difference between the value representing the page number and the threshold value. The field swap component 113 can store a value representing the calculated difference as a set of block field bits. The field swap component 113 can store a value representing the block number stored in the block field bits in the set of page field bits. The field swap component 113 can further indicate that the page field and block fields have been swapped using a set of conditions, which can include storing a fixed value as the first two bits of the block field bits. If the field swap component 113 determines that the fixed value is stored as the first two bits of the block field bits, the field swap component 113 will know that the set of conditions has been satisfied and thus the page field and block fields have been swapped. Further details with regards to the operations of the field swap component 113 are described below.

Figure 2:
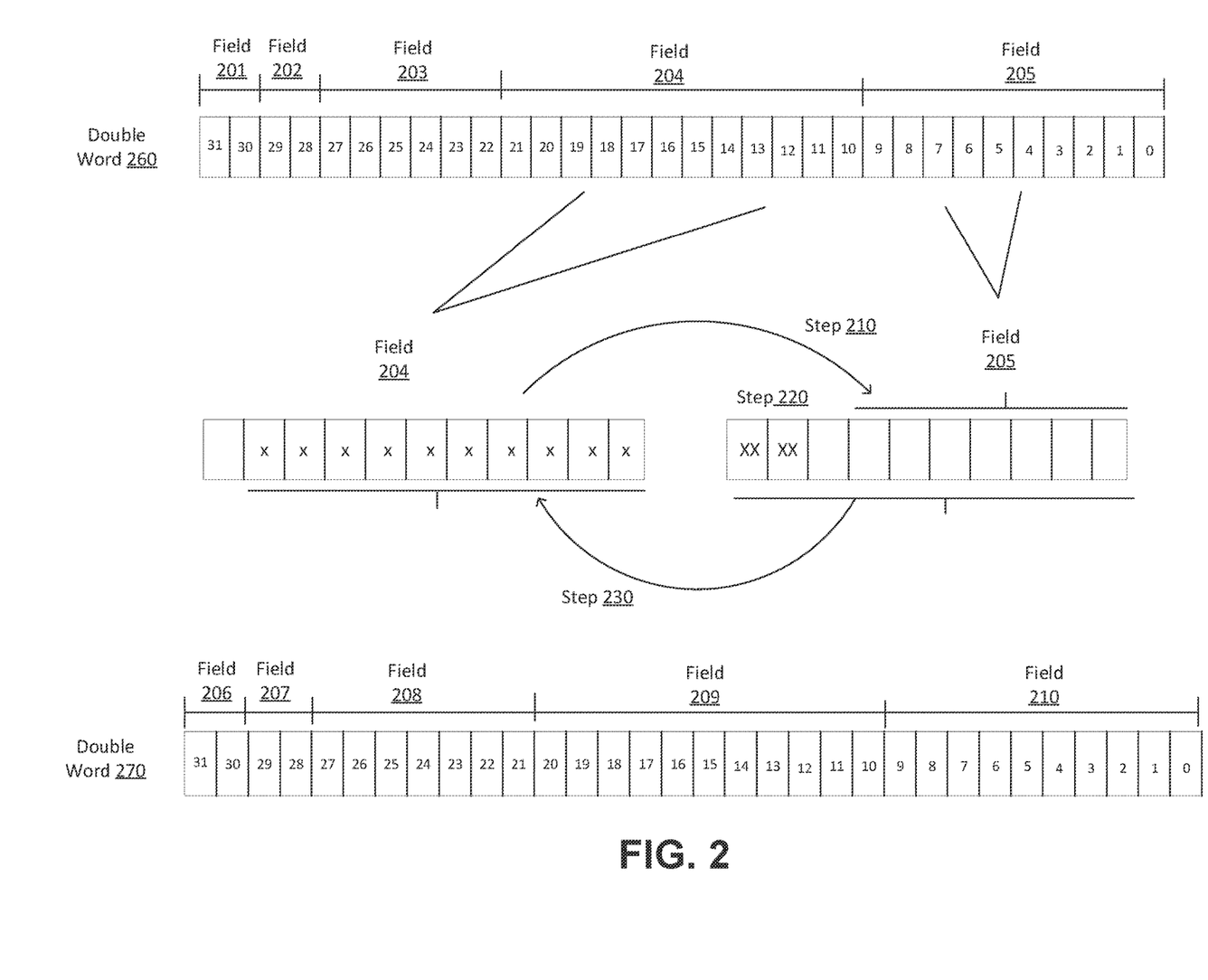
FIG. 2 illustrates an example block diagram of an initial double word and a resulting double word after smart swapping and effective encoding in accordance with some embodiments of the present disclosure.

FIG. 2 illustrates an example block diagram of an initial double word and a resulting double word after smart swapping and effective encoding in accordance with some embodiments of the present disclosure. As described above, in order for a memory sub-system to identify a physical address of a location at which data is stored on a memory device, the memory sub-system maintains an L2P table to identify the physical page address of the data. The table can include a number of double words that each include different fields used to identify the physical page address. In some embodiments, each double word can have a size of 32 bits. For example, a memory sub-system can have a double word 260, as illustrated in FIG. 2, which includes 32 bits, numbered from bit 0 to bit 31. In some embodiments, the double word 260 can include 5 different fields (field 201, field 202, field 203, field 204, field 205) which each require a certain number of bits to be represented. For example, field 201 can represent a TU offset; field 202 can represent a plane number; field 203 can represent a LUN number; field 204 can represent a page number; and field 205 can represent a block number. In FIG. 2, field 204 (i.e., the page field) requires 12 bits to be represented, and field 205 (i.e., the block field) requires 10 bits to be represented. As described above, in memory devices where certain fields, such as a page field and block field, require 22 bits in total to be represented, there can be performance issues due to a need to steal a bit from other fields, such as the LUN field or a parity bit field. In such cases, aspects of the present disclosure, such as the field swap component 113 described in FIG. 1, can perform smart swapping and efficient encoding of certain fields within the double word 260 in order to avoid needing to steal a bit from another field. For example, the field swap component 113 can identify the field 204 (i.e., the page field) and the field 205 (i.e., the block field). The field swap component 113 can determine that the value representing a page number stored in the field 204 satisfies some threshold criterion. In response to determining that the value representing the page number satisfies the threshold criterion, the field swap component 113 can determine a difference between the value representing the page number and the threshold criterion value. The field swap component 113 can store a value representing the difference in the field 205. For example, FIG. 2 illustrates a step 210, where the value representing the difference is moved from the field 204 to the field 205. The field swap component 113 can also store a value representing a block number stored in the field 205 in the field 204. For example, FIG. 2 illustrates a step 230, where the value representing the block number is moved from the field 205 to the field 204. The field swap component 113 can also set a special condition to indicate that a swap between the field 204 and the field 205 has occurred. For example, FIG. 2 illustrates a step 220, where the first two bits of the field 205 are set to a fixed value ("XX") which indicates the special condition has been satisfied.

FIG. 2 further illustrates a double word 270, the resulting double word after the field swap component 113 performs the smart swapping and efficient encoding of the field 204 and field 205. The double word 270 includes corresponding fields to the double word 260 (i.e., field 206 corresponds to field 201, field 207 corresponds to field 202, field 208 corresponds to field 203, field 209 corresponds to field 204, and field 210 corresponds to field 205). However, the double word 270 illustrates that, after the smart swapping and efficient encoding, the field 209 can be represented by 11 bits instead of 12 bits with no change to the bits required to represent the other fields. As described above, the ability to save a bit reduces cost and increases the performance of the memory device. Further details with regard to the field swap component 113 is described below.

Figure 3:
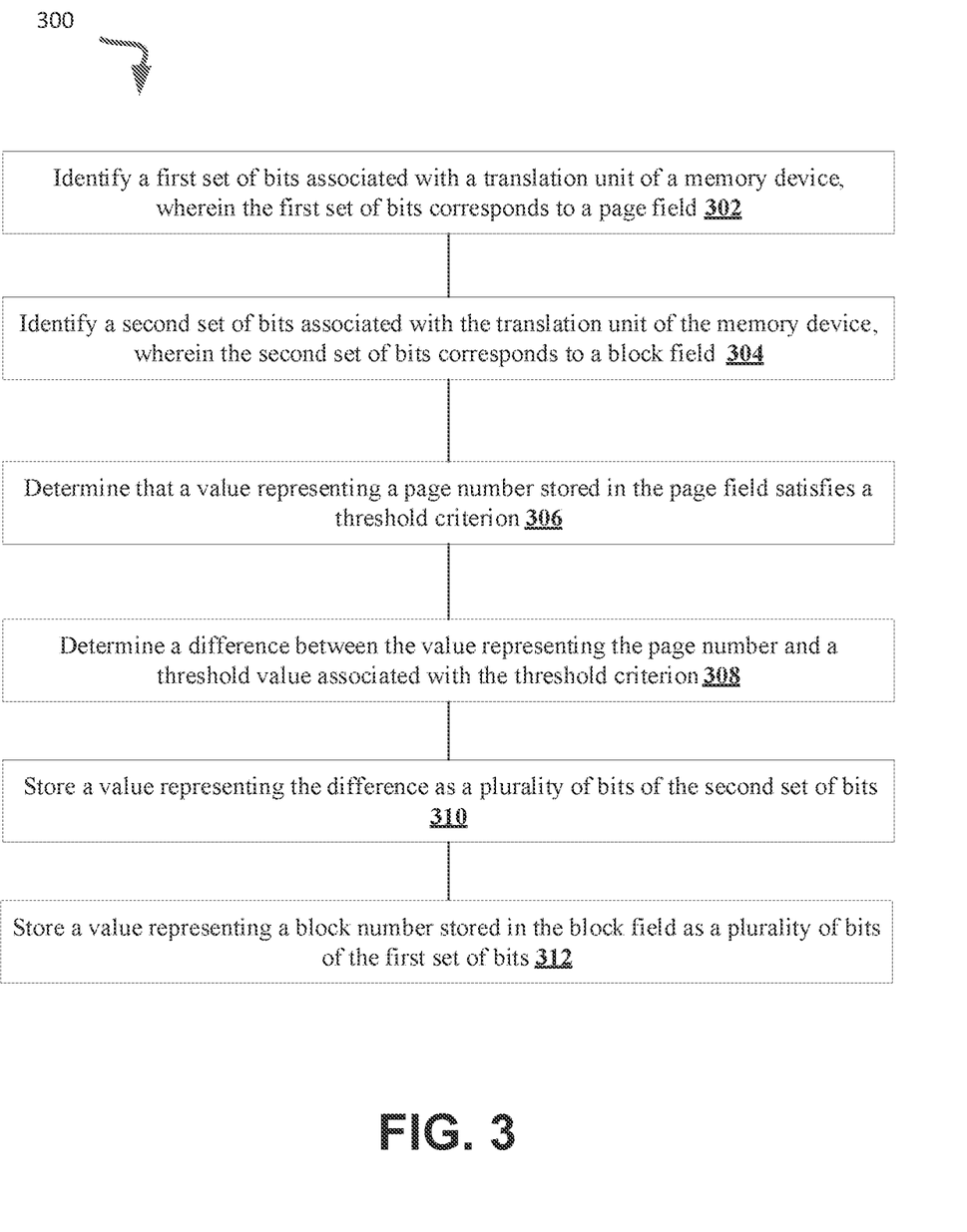
FIG. 3 is a flow diagram of an example method of smart swapping and effective encoding of a double word in a memory sub-system in accordance with some embodiments of the present disclosure.

FIG. 3 is a flow diagram of an example method 300 of smart swapping and effective encoding of a double word in a memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the field swap component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic identifies a first set of bits of a memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The first set of bits can correspond to the page field. In another embodiment, the first set of bits can correspond to another field, such as the block field. In some embodiments, the processing logic allocates the first set of bits according to a bit count. For example, the processing logic can determine the bit count of the first set of bits. In response to determining the bit count of the first set of bits, the processing logic can allocate a different number of bits to the first set of bits, such as allocating one less bit. For example, in some embodiments, the processing logic can determine the bit count of the first set of bits is 12 bits. The processing logic can then allocate 11 bits to the first set of bits instead of 12 bits.

At operation 304, the processing logic identifies a second set of bits of the memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The second set of bits can correspond to the block field. In another embodiment, the set of bits can correspond to another field, such as the page field.

At operation 306, the processing logic determines that a value representing a page number satisfies a threshold criterion. In some embodiments, the page number can be stored as the first set of bits, e.g., in the page field. In some embodiments, the page number stored as the first set of bits is stored in a portion of the entry in the L2P table corresponding to the translation unit. In some embodiments, determining that the value representing the page number satisfies the threshold criterion includes comparing the value representing the page number to a threshold value associated with the threshold criterion and determining that the value representing the page number is greater in value than the threshold value. In some embodiments, the threshold value is a fixed value (e.g., 2047). The threshold value can be set according to the parameters of the memory device, or it can be set by a host system of the memory sub-system. In some embodiments, the threshold value is a modifiable value. In some embodiments, the processing logic determines that the value representing the page number does not satisfy the threshold criterion. In response to determining that the value representing the page number does not satisfy the threshold criterion, the processing logic can store the value representing the page number as a set of bits of the first set of bits. In some embodiments, storing the value representing the page number as the set of bits of the first set of bits includes updating a portion of the entry in the L2P table corresponding to the translation unit with the value of the page number. In response to determining that the value representing the page number does not satisfy the threshold criterion, the processing logic can store the value representing the block number as a set of bits of the second set of bits. In some embodiments, storing the value representing the block number as the set of bits of the second set of bits includes updating a portion of the entry in the L2P table corresponding to the translation unit with the value of the block number. In some embodiments, determining that the value representing the page number does not satisfy the threshold criterion includes comparing the value representing the page number to the threshold value associated with the threshold criterion and determining that the value representing the page number is equal to, equivalent, or less in value than the threshold value.

At operation 308, responsive to determining that the value representing the page number satisfies the threshold criterion, the processing logic determines a difference between the value representing the page number and a threshold value associated with the threshold criterion. In some embodiments, determining the difference includes subtracting threshold value from the value representing the page number.

At operation 310, responsive to determining that the value representing the page number satisfies the threshold criterion, the processing logic stores a value representing the difference as a set of bits of the second set of bits. In some embodiments, storing the value representing the difference as the set of bits of the second set of bits includes updating a portion of the entry in the L2P table corresponding to the translation unit with the value representing the difference.

At operation 312, responsive to determining that the value representing the page number satisfies the threshold criterion, the processing logic stores a value representing a block number as a set of bits of the first set of bits. In some embodiments, the block number can be stored as the second set of bits, e.g., in the block field. In some embodiments, storing the value representing the block number as the set of bits of the first set of bits includes updating a portion of the entry in the L2P table corresponding to the translation unit with the value of the block number. In some embodiments, the processing logic stores a fixed value as two bits of the second set of bits. In some embodiments, storing the value representing the fixed value as two bits of the second set of bits includes updating a portion of the entry in the L2P table corresponding to the translation unit with the fixed value. In some embodiments, the processing logic stores the fixed value as the last two consecutive bits of the second set of bits. In some embodiments, the fixed value is an integer value, such as 1. In some embodiments, storing the fixed value as two bits of the second set of bits indicates to the processing logic that a special condition has been met. In some embodiments, the special condition includes that a swap has occurred between the page field and the block field.

Figure 4:
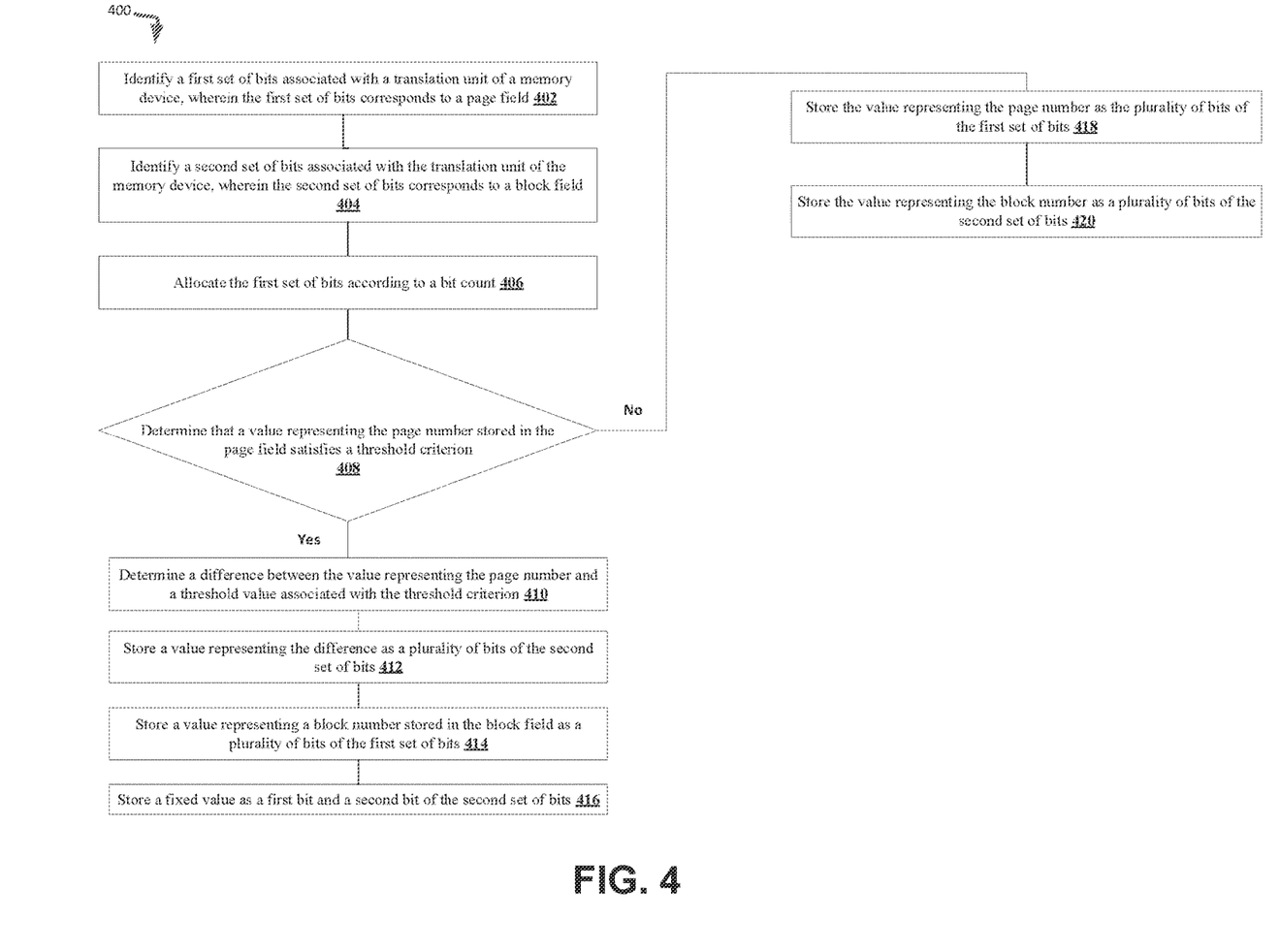
FIG. 4 is a flow diagram of an example method of smart swapping and effective encoding of a double word in a memory sub-system in accordance with some embodiments of the present disclosure.

FIG. 4 is a flow diagram of an example method 400 of smart swapping and effective encoding of a double word in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the field swap component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic identifies a first set of bits of a memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The first set of bits can correspond to the page field. In another embodiment, the first set of bits can correspond to another field, such as the block field.

At operation 404, the processing logic identifies a second set of bits of the memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The second set of bits can correspond to the block field. In another embodiment, the set of bits can correspond to another field, such as the page field.

At operation 406, the processing logic allocates the first set of bits according to a bit count. For example, the processing logic can determine the bit count of the first set of bits. In response to determining the bit count of the first set of bits, the processing logic can allocate a different number of bits to the first set of bits, such as allocating one less bit. For example, in some embodiments, the processing logic can determine the bit count of the first set of bits is 12 bits. The processing logic can then allocate 11 bits to the first set of bits instead of 12 bits.

At operation 408, the processing logic determines that a value representing a page number satisfies a threshold criterion. In some embodiments, the page number can be stored as the first set of bits, e.g., in the page field. In some embodiments, the page number stored as the first set of bits is stored in a portion of the entry in the L2P table corresponding to the translation unit. In some embodiments, determining that the value representing the page number satisfies the threshold criterion includes comparing the value representing the page number to a threshold value associated with the threshold criterion and determining that the value representing the page number is greater in value than the threshold value. In some embodiments, the threshold value is a fixed value (e.g., 2047). The threshold value can be set according to the parameters of the memory device, or it can be set by a host system of the memory sub-system. In some embodiments, the threshold value is a modifiable value.

At operation 410, responsive to determining that the value representing the page number satisfies the threshold criterion, the processing logic determines a difference between the value representing the page number and a threshold value associated with the threshold criterion. In some embodiments, determining the difference includes subtracting threshold value from the value representing the page number.

At operation 412, responsive to determining that the value representing the page number satisfies the threshold criterion, the processing logic stores a value representing the difference as a set of bits of the second set of bits. In some embodiments, storing the value representing the difference as the set of bits of the second set of bits includes updating a portion of the entry in the L2P table corresponding to the translation unit with the value representing the difference.

At operation 414, responsive to determining that the value representing the page number satisfies the threshold criterion, the processing logic stores a value representing the difference as a set of bits of the second set of bits. In some embodiments, storing the value representing the difference as the set of bits of the second set of bits includes updating a portion of the entry in the L2P table corresponding to the translation unit with the value representing the difference.

At operation 416, the processing logic stores a fixed value as two bits of the second set of bits. In some embodiments, storing the value representing the fixed value as two bits of the second set of bits includes updating a portion of the entry in the L2P table corresponding to the translation unit with the fixed value. In some embodiments, the processing logic stores the fixed value as the last two consecutive bits of the second set of bits. In some embodiments, the fixed value is an integer value, such as 1. In some embodiments, storing the fixed value as two bits of the second set of bits indicates to the processing logic that a special condition has been met. In some embodiments, the special condition includes that a swap has occurred between the page field and the block field.

At operation 418, in response to determining that the value representing the page number does not satisfy the threshold criterion, the processing logic can store the value representing the page number as a set of bits of the first set of bits. In some embodiments, storing the value representing the page number as the set of bits of the first set of bits includes updating a portion of the entry in the L2P table corresponding to the translation unit with the value of the page number. In some embodiments, determining that the value representing the page number does not satisfy the threshold criterion includes comparing the value representing the page number to the threshold value associated with the threshold criterion and determining that the value representing the page number is equal to, equivalent, or less in value than the threshold value.

At operation 420, in response to determining that the value representing the page number does not satisfy the threshold criterion, the processing logic can store the value representing the block number as a set of bits of the second set of bits. In some embodiments, storing the value representing the block number as the set of bits of the second set of bits includes updating a portion of the entry in the L2P table corresponding to the translation unit with the value of the block number. In some embodiments, determining that the value representing the page number does not satisfy the threshold criterion includes comparing the value representing the page number to the threshold value associated with the threshold criterion and determining that the value representing the page number is equal to, equivalent, or less in value than the threshold value.

Figure 5:
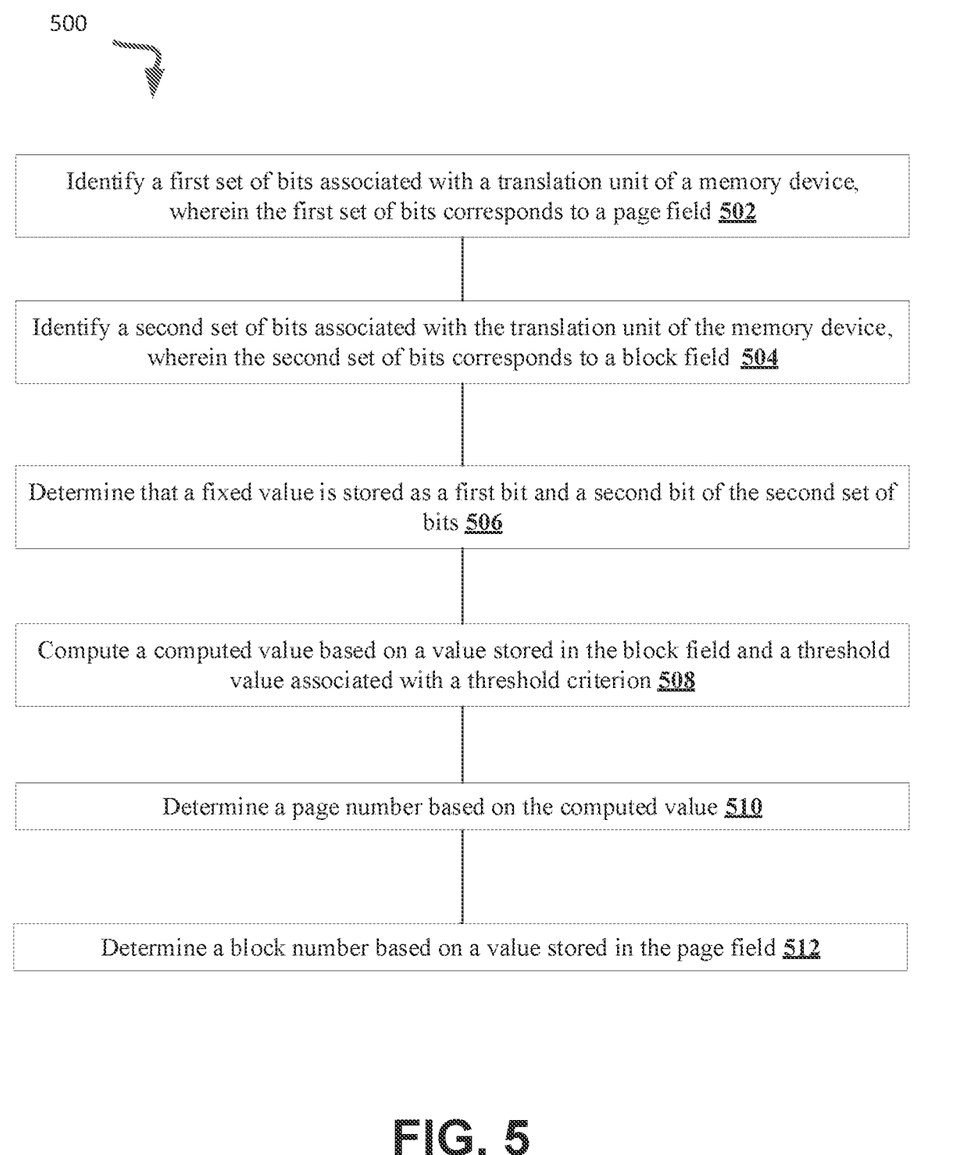
FIG. 5 is a flow diagram of an example method of smart swapping and effective encoding of a double word in a memory sub-system in accordance with some embodiments of the present disclosure.

FIG. 5 is a flow diagram of an example method 500 of smart swapping and effective encoding of a double word in a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the field swap component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic identifies a first set of bits of a memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The first set of bits can correspond to the page field. In another embodiment, the first set of bits can correspond to another field, such as the block field. In some embodiments, the processing logic allocates the first set of bits according to a bit count. For example, the processing logic can determine the bit count of the first set of bits. In response to determining the bit count of the first set of bits, the processing logic can allocate a different number of bits to the first set of bits, such as allocating one less bit. For example, in some embodiments, the processing logic can determine the bit count of the first set of bits is 12 bits. The processing logic can then allocate 11 bits to the first set of bits instead of 12 bits.

At operation 504, the processing logic identifies a second set of bits of the memory device. In some embodiments, the first set of bits corresponds to a translation unit of the memory device. The translation unit of the memory device can include a set of fields, such as a page field, a block field, a plane number field, and an offset field. The set of fields can be used to identify a physical page address of the translation unit. The set of fields can be stored as portions of an entry (i.e., double word) in a data structure, such as an L2P table. In some embodiments, each double word can include 32 bits. In some embodiments, each field can require a set number of bits in order to be represented. For example, the page field can require 12 bits, the block field can require 10, the plane number field can require 2 bits, and the offset field can require 2 bits. In some embodiments, the number of bits that each field requires depends on parameters set by the memory device, such as a total page count and total block count of the memory device. The second set of bits can correspond to the block field. In another embodiment, the set of bits can correspond to another field, such as the page field.

At operation 506, the processing logic determines that a fixed value is stored as a first bit and a second bit of the second set of bits. In some embodiments, determining that the fixed value is stored as the first bit and the second bit of the second set of bits can include identifying a first value stored as the first bit of the second set of bits in a portion of the entry in the L2P table corresponding to the translation unit. The processing logic can identify a second value stored as the second bit of the second set of bits in a portion of the entry in the L2P table corresponding to the translation unit. The processing logic can compare the first value to the second value. The processing logic can determine that the first value and the second value are equal to the fixed value. In some embodiments, the fixed value is an integer value, such as 1. In some embodiments, the processing logic determines that the fixed value is stored as the last two consecutive bits of the second set of bits. In some embodiments, determining that the fixed value is stored as the first bit and the second bit of the second set of bits includes determining that a special condition has been met. In some embodiments, the special condition includes that a swap has occurred between the page field and the block field. In some embodiments, if the processing logic determines that the fixed value is not stored as the first bit and the second bit of the second set of bits, the processing logic determines the page number based on the value stored in the page field. In some embodiments, determining the page number based on the value stored in the page field includes setting a value representing the page number equal to the value stored in the page field. In some embodiments, setting the value representing the page number equal to the value stored in the page field includes updating a portion of the entry in the L2P table corresponding to the translation unit with the value representing the page number. In some embodiments, if the processing logic determines that the fixed value is not stored as the first bit and the second bit of the second set of bits, the processing logic determines the block number based on the value stored in the block field. In some embodiments, determining the block number based on the value stored in the block field includes setting a value representing the block number equal to the value stored in the block field. In some embodiments, setting the value representing the block number equal to the value stored in the block field includes updating a portion of the entry in the L2P table corresponding to the translation unit with the value representing the block number.

At operation 508, the processing logic computes a computed value. In some embodiments, computing the computed value includes adding a value stored in the block field to a threshold value associated with a threshold criterion. In some embodiments, the processing logic can identify the value stored in the block field using a portion of the entry in the L2P table corresponding to the translation unit. In some embodiments, the threshold value is a fixed value (e.g., 2047). The threshold value can be set according to the parameters of the memory device, or it can be set by a host system of the memory sub-system. In some embodiments, the threshold value is a modifiable value.

At operation 510, the processing logic determines a page number based on the computed value. In some embodiments, determining the page number based on the computed value includes setting a value representing the page number to be equal to the computed value. In some embodiments, setting the value representing the page number to be equal to the computed value includes updating a portion of the entry in the L2P table corresponding to the translation unit with the value representing the page number.

At operation 512, the processing logic determines a block number based on a value stored in the page field. In some embodiments, determining the block number based on the value stored in the page field includes setting a value representing the block number to be equal to the value stored in the page field. In some embodiments, setting the value representing the block number to be equal to the value stored in the page field includes updating a portion of the entry in the L2P table corresponding to the translation unit with the value representing the block number.

Figure 6:
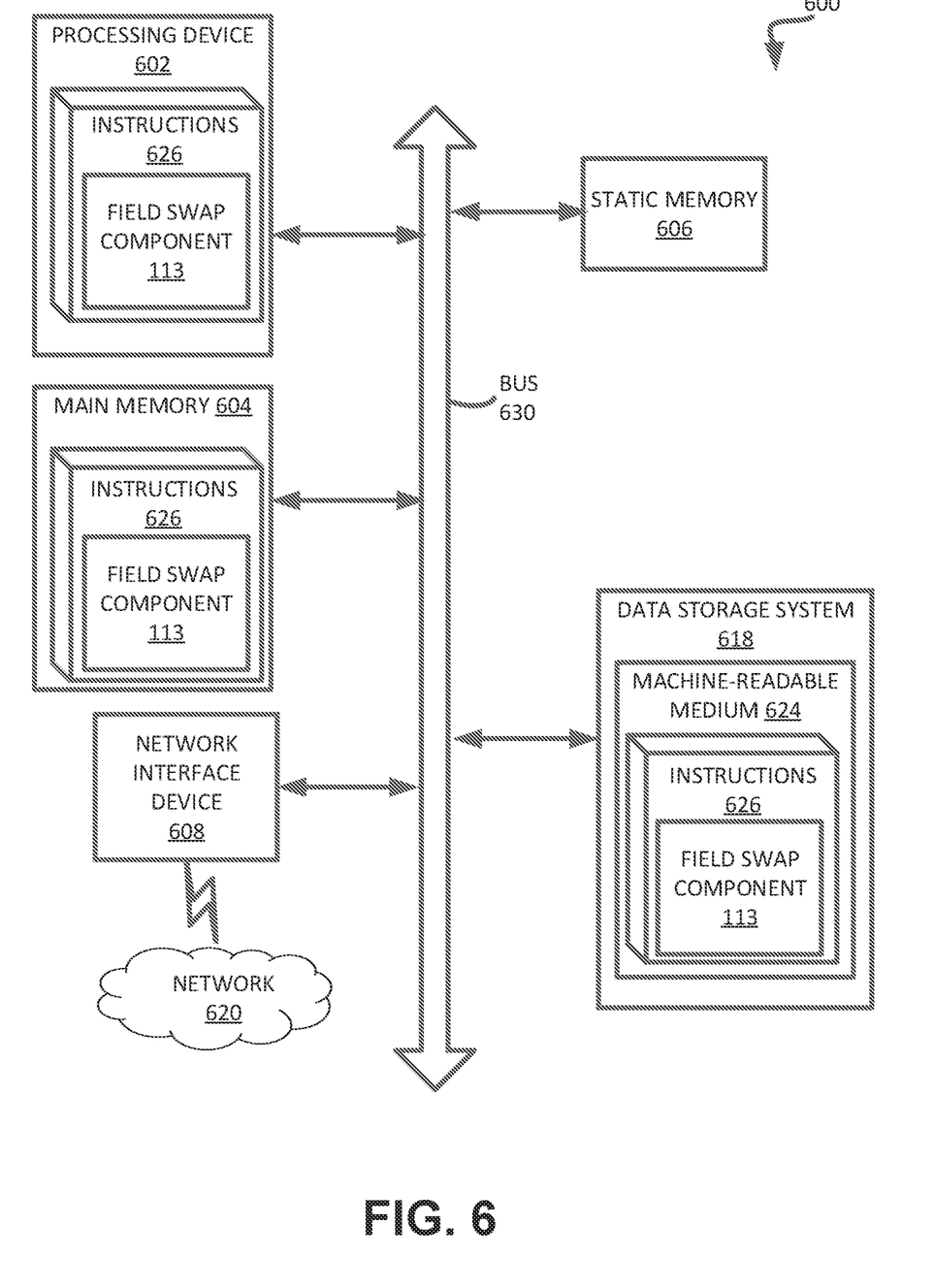
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the field swap component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a field swap component (e.g., the field swap component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
  identifying a first set of bits associated with a translation unit of the memory device, wherein the first set of bits corresponds to a page field;
  identifying a second set of bits associated with the translation unit of the memory device, wherein the second set of bits corresponds to a block field;
  updating a first portion of an address mapping table corresponding to the second set of bits with a value representing a difference between a value stored in the page field and a threshold value;
  updating a second portion of the address mapping table corresponding to the first set of bits with a value representing a block number stored in the block field;
  determining, based on the updated first portion and the updated second portion of the address mapping table, that a swapping condition is satisfied, wherein the swapping condition indicates that the page field and the block field are swapped; and
  responsive to determining that the swapping condition is satisfied, performing a data access operation on a set of memory cells residing at a location corresponding to the translation unit.

2. The system of claim 1, further comprising:
storing a fixed value as a first bit of the second set of bits and a second bit of the second set of bits.

3. The system of claim 1, wherein the translation unit comprises a plurality of fields, wherein the plurality of fields include the page field, the block field, a plane number field, and an offset field.

4. The system of claim 1, wherein the processing device is to perform operations further comprising:
allocating the first set of bits according to a bit count.

5. The system of claim 1, wherein the processing device is to perform operations further comprising:
responsive to determining that a value representing a page number stored in the page field does not satisfy a threshold criterion, storing the value representing the page number as a plurality of bits of the first set of bits.

6. The system of claim 1, wherein the processing device is to perform operations further comprising:
responsive to determining that a value representing a page number stored in the page field does not satisfy a threshold criterion, storing the value representing the block number as a plurality of bits of the second set of bits.

7. The system of claim 1, further comprising:
determining that a value representing a page number stored in the page field satisfies a threshold criterion; and
responsive to determining that the value representing the page number satisfies the threshold criterion, determining the difference between the value stored in the page field and the threshold value.

8. A method comprising:
identifying a first set of bits associated with a translation unit of a memory device, wherein the first set of bits corresponds to a page field;
identifying a second set of bits associated with the translation unit of the memory device, wherein the second set of bits corresponds to a block field;
updating a first portion of an address mapping table corresponding to the second set of bits with a value representing a difference between a value stored in the page field and a threshold value;
updating a second portion of the address mapping table corresponding to the first set of bits with a value representing a block number stored in the block field;
determining, based on the updated first portion and the updated second portion of the address mapping table, that a swapping condition is satisfied, wherein the swapping condition indicates that the page field and the block field are swapped; and
responsive to determining that the swapping condition is satisfied, performing a data access operation on a set of memory cells residing at a location corresponding to the translation unit.

9. The method of claim 8, further comprising:
storing a fixed value as a first bit of the second set of bits and a second bit of the second set of bits.

10. The method of claim 8, wherein the translation unit comprises a plurality of fields, wherein the plurality of fields include the page field, the block field, a plane number field, and an offset field.

11. The method of claim 8, further comprising:
allocating the first set of bits according to a bit count.

12. The method of claim 8, further comprising:
responsive to determining that a value representing a page number stored in the page field does not satisfy a threshold criterion, storing the value representing the page number as a plurality of bits of the first set of bits.

13. The method of claim 8, further comprising:
responsive to determining that a value representing a page number stored in the page field does not satisfy a threshold criterion, storing the value representing the block number as a plurality of bits of the second set of bits.

14. The method of claim 8, further comprising:
determining that a value representing a page number stored in the page field satisfies a threshold criterion; and
responsive to determining that the value representing the page number satisfies the threshold criterion, determining the difference between the value stored in the page field and the threshold value.

15. A non-transitory computer-readable storage medium comprising instructions that, when executed by a processing device, cause the processing device to perform operations comprising:
identifying a first set of bits associated with a translation unit of a memory device, wherein the first set of bits corresponds to a page field;
identifying a second set of bits associated with the translation unit of the memory device, wherein the second set of bits corresponds to a block field;
updating a first portion of an address mapping table corresponding to the second set of bits with a value representing a difference between a value stored in the page field and a threshold value;
updating a second portion of the address mapping table corresponding to the first set of bits with a value representing a block number stored in the block field;
determining, based on the updated first portion and the updated second portion of the address mapping table, that a swapping condition is satisfied, wherein the swapping condition indicates that the page field and the block field are swapped; and
responsive to determining that the swapping condition is satisfied, performing a data access operation on a set of memory cells residing at a location corresponding to the translation unit.

16. The non-transitory computer-readable storage medium of claim 15, wherein the translation unit comprises a plurality of fields, wherein the plurality of fields include the page field, the block field, a plane number field, and an offset field.

17. The non-transitory computer-readable storage medium of claim 15, wherein the processing device is to perform operations further comprising:
responsive to determining that a value representing a page number stored in the page field does not satisfy a threshold criterion, storing the value representing the page number as a plurality of bits of the first set of bits.

18. The non-transitory computer-readable storage medium of claim 15, wherein the processing device is to perform operations further comprising:
responsive to determining that a value representing a page number stored in the page field does not satisfy a threshold criterion, storing the value representing the block number as a plurality of bits of the second set of bits.

19. The non-transitory computer-readable storage medium of claim 15, wherein the processing device is to perform operations further comprising:
determining that a value representing a page number stored in the page field satisfies a threshold criterion; and
responsive to determining that the value representing the page number satisfies the threshold criterion, determining the difference between the value stored in the page field and the threshold value.

20. The non-transitory computer-readable storage medium of claim 15, wherein the processing device is to perform operations further comprising:
storing a fixed value as a first bit of the second set of bits and a second bit of the second set of bits.

* * * * *